United States Patent Office 3,657,381
Patented Apr. 18, 1972

3,657,381
COATINGS CONTAINING POLYVINYL CHLORIDE, EPOXY RESINS, AND ESTERS OF POLYHYDRIC ALCOHOLS HAVING AT LEAST THREE ACRYLATE GROUPS
Rene Speitel, Rheinfelden, and Max R. Hegnauer, Im Steinacker, Aesch, Switzerland, assignors to Arfa Rohrenwerke A.G., Basel, Switzerland
No Drawing. Filed Mar. 26, 1970, Ser. No. 23,070
Claims priority, application Switzerland, Nov. 20, 1969, 17,313/69
Int. Cl. C08g 45/04
U.S. Cl. 260—836                7 Claims

ABSTRACT OF THE DISCLOSURE

A method of producing a strongly adherent, corrosion-resistant coating on a substrate by applying to the substrate a composition having a polyvinyl chloride base and containing (a) 5–20% by weight of the polyvinyl chloride of at least one solid and/or liquid precondensate of epichlorohydrin and bis-phenol, and (b) at least one ethylenically unsaturated cross-linking monomer selected from esters of polyalcohols containing more than two acrylic or methacrylic acid residues, the proportion of component (b) to component (a) being 2–5.1. Also provided are the compositions used as coating material in such method.

---

Applicants' copending application Ser. No. 617,043, now U.S. Pat. No. 3,513,222, describes a method of producing firmly-adhering and corrosion-resistant coatings, which method consists of applying to the article to be coated a polyvinyl chloride plastisol, a polyvinyl chloride organosol or a polyvinyl chloride dry blend which contains at least one heat-polymerizing cross-linking monomer, at least one solid reaction product of epichlorohydrin and at least one bisphenol, and optionally, a catalyst for the monomer or monomers, in the presence or absence of monomeric or polymeric plasticizers or extenders which are usually employed in polyvinyl chloride compositions, and then fusing the mixture by heating. According to such application, the heat-polymerizing cross-linking monomer used is a monomer consisting of a diester of acrylic acid or methacrylic acid and a dihydric alcohol. The solid reaction product of epichlorohydrin and at least one bisphenol, e.g. bisphenol A, used is a reaction product having an average epoxide value of 0.25 to 0.32, a hydroxyl value of 0.34 to 0.77 and a molecular weight of approximately 700 to approximately 3800; these compounds are hereinafter referred to as solid epoxide precondensates.

Coatings made of the foregoing stated compositions possess excellent mechanical and thermal strength and pronounced resistance to attack by inorganic, diluted and concentrated acids, aqueous cold and hot salt solutions and diluted and concentrated alkalis. Their remarkably firm adherence to the carriers onto which they are coated is unaffected even after several hundred working cycles of 10 minutes each in hot and cold aqueous synthetic washing liquors.

On the basis of many years of practical experience, coatings used as protection against corrosion are applied to the articles to be protected as films having a minimum thickness of 100μ. It is particularly essential to maintain this minimum thickness of film if the material of the coating is applied in a single coating operation, e.g. by dipping or slush-coating, and if this requirement is met, the adhesion of the film is excellent. It becomes progressively poorer however in the case of films of diminishing thickness.

No difficulties occur in practice as regards coatings of the compositions as described in the above-mentioned copending application when these are applied, for example, to sheet-metal, weldless pipes or pipes having properly machined welds, sections and wires, since in any case thicknesses of coating of more than 100μ are usual for such products.

However, if thinner corrosion-resistant films are obtained or required, such as result for example from electrostatic spraying with polyvinyl chloride plastisols, polyvinyl chloride organosols or polyvinyl chloride sintered powders, or if such thinner films are unintentionally formed alongside standard coatings of more than 100μ in thickness, then in some circumstances the locally inadequate adhesion of the film has a deleterious effect as regards permanent protection against corrosion. It is well known that this undesirable phenomenon occurs when welded pipe systems are coated by dipping or slush-coating, since the liquid coating material is repelled at unmachined welds or edges as a result of the surface tension, and only a thin film remains at these points. Many welds within the interior of pipes—particularly in the case of pipe-branches of different lengths, diameters and construction—are very often difficult to reach with the deburring tools (whether operated mechanically or by hand) and they cannot be inspected or checked, so that proper machining of these areas is not possible and must inevitably lead to the formation of thin non-adhering films.

Surprisingly, it has now been found that coatings can be obtained that exhibit quite excellent adhesiveness, both in thicknesses of only approximately 10μ and in thicknesses of up to 350μ and more, if, in accordance with the present invention, the diacrylic acid or dimethacrylic acid esters in the composition in accordance with copending Ser. No. 617,043 (U.S. Pat. No. 3,513,222) are replaced by such esters which contain more than two acrylic acid or methacrylic acid groups. It has also been found that the excellent adhesion is also retained even if liquid epoxide precondensates are used in the coating composition in place of the previously used solid reaction products of epichlorohydrin and a bisphenol. Thus, in combination with the above-mentioned polyacrylates or polymethacrylates, both liquid and solid epoxide precondensates, i.e. epoxide precondensates having a molecular weight of approximately 350 to approximately 3800, provide coatings which adhere firmly in the stated thickness-range.

Quite unexpectedly, the compositions in question are found to retain their pot-life over quite long time periods (several weeks) and this is a considerable advantage particularly when fairly large dipping vats are used. Apart from the already-mentioned excellent adhesion to the substrate, coatings produced in this manner exhibit very good physical, chemical, thermal and mechanical properties, some of which are even superior to those of the coatings produced in accordance with applicants' copending application, now U.S. Pat. No. 3,513,222.

The method of the present invention thus consists of applying to the article to be coated a polyvinyl chloride plastisol, polyvinyl chloride organosol or polyvinyl chloride dry blend, which contains at least one ethylenically unsaturated cross-linking monomer selected from esters of polyalcohols containing more than two acrylic acid or methacrylic acid groups, a liquid or solid epoxide precondensate of epichlorohydrin and a bis-phenol, preferably a polymerization catalyst and, optionally, a hardener and/or a plasticizer, and then fusing the composition onto the article to be coated by heating. If required or desired, flow-regulators, thinners, thixotropy adjusting means, fillers and/or pigments can be added to the above composition.

Preferably, the temperatures employed for stoving the coated article range from 170 to 280° C., and the stoving time ranges from 3 to 30 minutes.

The amount of solid and/or liquid percondensate employed is preferably 5–20% based on the weight of the polyvinyl chloride. The proportion of monomer to precondensate is preferably 2–5:1 by weight.

Monomeric polyacrylates or polymethacrylates that have proved particularly suitable are tri-esters and tetra-esters that are based on acrylic acid or methacrylic acid and polyhydric alcohols, the alcohol component possibly being glycerine, erythritol, pentaerythritol, or a pentitol or hexitol, as for example liquid trimethylolpropane-trimethacrylate

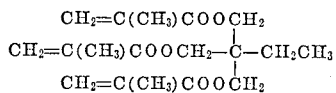

liquid pentaerythritol-trimethacrylate or solid pentaerythritoltetramethacrylate. Since the stated liquid monomeric acrylates dissolve both the liquid and solid epoxide precondensates, their use involves no difficulties. On the other hand, the solid pentaerythritol-tetramethacrylate must be dissolved beforehand in suitable plasticizers, as for example, dibutyl phthalate, dioctyl phthalate, dinonyl phthalate and adipic acid-benzyloctyl ester, which are capable of dissolving both liquid and solid epoxide precondensates.

The preferred polymerization catalysts are peroxy compounds, i.e. peroxides, which have a decomposition point preferably above 100° C., for example, tert. butyl perbenzoate, tert. butyl hydroperoxide, cumyl hydroperoxide, dicumyl peroxide, etc. Suitable hardeners are organic complex compounds, e.g. those of boron trifluoride; dicyandiamide, and phenol, melamine or urea resins.

EXAMPLE 1

Plastisol

| | G. |
|---|---|
| Trimethylolpropane-trimethacrylate (liquid) | 200 |
| Tert. butyl hydroperoxide (polymerization-catalyst) | 1 |
| Dioctyl phthalate (plasticizer) | 200 |
| Modified dibutyl tin maleate (heat stabilizer) | 22 |
| Epoxide precondensate (reaction product of epichlorohydrin and bisphenol A)—molecular wt. approx. 900 (solid) | 48 |
| Titanium dioxide (pigment) | 60 |
| Chalk (filler) | 240 |
| Finely pulverized mica (filler) | 20 |
| Aerosil (finely dispersed silicon dioxide, thixotrophy adjusting agent) | 2 |
| Polyvinyl chloride | 600 |
| | 1393 |

The liquid constituents are first mixed by stirring them together, the solid constituents are then added in succession to the viscous solution obtained while continuing the stirring, and finally the polyvinyl chloride is added slowly while the mixture is being constantly stirred.

EXAMPLE 2

Organosol

| | G. |
|---|---|
| Pentaerythritol-trimethacrylate (liquid) | 200 |
| Epoxide precondensate—molecular weight approx. 1400 (solid) | 40 |
| Dioctyl adipate | 300 |
| Dibutyl tin maleate | 20 |
| Tert. butyl peroxide | 2 |
| Titanium dioxide | 5 |
| Chalk | 300 |
| Aerosil | 5 |
| Polyvinyl chloride | 600 |
| Butanol | 60 |
| White spirit (mixture of mainly aliphatic hydrocarbons) | 60 |
| | 1592 |

The same procedure is used as in Example 1 and following this the solvents (butanol and white spirit) are added, these being intended to bring the viscosity of the composition to the required level.

EXAMPLE 3

Sintered powder

| | G. |
|---|---|
| Pentaerythritol-tetramethacrylate (solid) | 200 |
| Epoxide precondensate—molecular weight approx. 380 (liquid) | 40 |
| Dinonyl phthalate | 150 |
| Adipic acid-benzyloctyl ester | 25 |
| Cumyl hydroperoxide | 3 |
| Dibutyl tin maleate | 6 |
| Boron trifluoride-ethylamine complex (hardener) | 4 |
| Titanium dioxide | 25 |
| Polyvinyl chloride | 600 |
| | 1053 |

The sequence of the procedure of Example 1 is reversed, i.e. the solid constituents are mixed one after the other with the polyvinyl chloride, and the liquid constituents are then added slowly to the solid mixture obtained while stirring moderately.

When any of the resultant compositions of Examples 1–3 are applied to the substrate to be coated by dipping, slush-coating, spreading, spraying or electrostatic spraying and stoved for 30 minutes at 170° C., an article having a coating adhered firmly to the substrate (e.g. metal, glass or ceramics) is obtained.

We claim:

1. A coating composition consisting essentially of (a) polyvinyl chloride, (b) from 5 to 20% by weight of the polyvinyl chloride of a solid or liquid epoxide resin having an average molecular weight of about 350 to 3800, and (c) as a cross-linking monomer, an ester of a polyalcohol containing at least three acrylic or methacrylic acid residues in a proportion of from 2 to 5 times the weight of the epoxide resin.

2. The composition according to claim 1, and further containing a peroxy compound as catalyst for polymerization of the monomer.

3. The composition according to claim 2, wherein the polymerization catalyst has a decomposition point above 100° C.

4. The composition according to claim 1, and further containing a plastisol-producing proportion of a plasticiser for polyvinyl chloride.

5. A composition according to claim 1, and further containing a plastisol-producing proportion of a plasticizer for polyvinyl chloride, and a thinner.

6. The composition according to claim 1, wherein the monomer is at least one member selected from the group consisting of trimethylolpropane-trimethacrylate, pentaerythritol-trimethacrylate and pentaerythritol-tetramethacrylate.

7. A process for producing a strongly adherent, corrosion-resistant coating on an article, which comprises applying to at least one surface of the article a coating of a composition as defined in claim 1, and stoving the resultant coated article for 3 to 30 minutes at 170 to 280° C.

References Cited

UNITED STATES PATENTS

| | | | |
|---|---|---|---|
| 2,971,933 | 2/1961 | Beal | 260—837 |
| 2,609,355 | 9/1952 | Winkler | 260—837 |
| 2,707,177 | 4/1955 | Skiff | 260—837 |
| 2,826,562 | 3/1958 | Shokal | 260—836 |
| 2,892,808 | 6/1959 | Shafer | 260—837 |

PAUL LIEBERMAN, Primary Examiner

U.S. Cl. X.R.

260—31.8 E, 31.8 M, 37 Ep, 47 EC, 47 EN, 834, 837 PV